United States Patent [19]

Jung

[11] Patent Number: 5,532,479
[45] Date of Patent: Jul. 2, 1996

[54] TEMPERATURE, PRESSURE, VIBRATION OR HUMIDITY SENSOR BASED ON REFLECTED LIGHT FROM A BIMETALLIC, PLASTIC OR DEHUMIDIFYING MATERIAL

[75] Inventor: Kwang G. Jung, Seoul, Rep. of Korea

[73] Assignee: Goldstar Co., Ltd., Rep. of Korea

[21] Appl. No.: 337,547

[22] Filed: Nov. 10, 1994

[30] Foreign Application Priority Data

Nov. 11, 1993 [KR] Rep. of Korea ............... 1993-23964

[51] Int. Cl.$^6$ ............................................. G01D 5/34
[52] U.S. Cl. .................. 250/231.11; 250/231.19; 374/205; 73/862.624
[58] Field of Search .................... 250/231.1, 231.11, 250/231.19, 206.1, 554.29; 374/205, 206, 207, 130; 73/862.624

[56] References Cited

U.S. PATENT DOCUMENTS

| | | | |
|---|---|---|---|
| 4,002,975 | 1/1977 | Erickson et al. | 324/96 |
| 4,521,683 | 6/1985 | Miller | 250/221 |
| 4,672,199 | 6/1987 | Anderson et al. | |
| 4,762,426 | 8/1988 | Foss | 374/130 |
| 5,031,987 | 7/1991 | Norling | 350/96.15 |
| 5,146,080 | 9/1992 | Opheij | 250/216 |
| 5,351,547 | 10/1994 | Grudzien, Jr. et al. | 73/705 |

Primary Examiner—Edward P. Westin
Assistant Examiner—Stephen Calogero

[57] ABSTRACT

A multi-function sensor using a semiconductor laser capable of sensing a value of a measurement object such as temperature, humidity, pressure or vibration on the basis of a variation in the distance between a measurement object medium adapted to respond to a variation in the measurement object and a focus of laser beams projected onto the measurement object medium and thereby capable of measuring the measurement object in a high accuracy irrespective of a variation in the quantity of laser beams depending on a variation in surrounding circumstance.

4 Claims, 4 Drawing Sheets

TEMPERATURE, PRESSURE, VIBRATION OR HUMIDITY SENSOR BASED ON REFLECTED LIGHT FROM A BIMETALLIC, PLASTIC OR DEHUMIDIFYING MATERIAL

BACKGROUND OF THE INVENTION

1. Field of the Invention

The present invention relates to a multi-function sensor using a semiconductor laser, and more particularly to a multi-function sensor using a semiconductor laser capable of sensing a value of a measurement object such as temperature, humidity, pressure or vibration on the basis of a variation in distance between the measurement object medium adapted to respond to a variation in the measurement object and a focus of laser beams projected onto the measurement object medium.

2. Description of the Prior Art

Generally, a sensor for measuring a temperature of an object includes a thermocouple adapted to generate a thermal electromotive force corresponding to the temperature of the object measured at a point where the measurement is carried out. The sensor detects a voltage corresponding to the thermal electromotive force and thereby senses the temperature of the object.

Referring to FIG. 1, there is illustrated a conventional temperature sensor utilizing a thermocouple. As shown in FIG. 1, the temperature sensor includes a thermocouple T for generating a thermal electromotive force corresponding to a temperature of an object detected at a point p where the measurement is carried out, a linearizer 1 for linearizing the thermal electromotive force output from a connection terminal board C of the thermocouple T, and a cold junction compensation circuit 2.

In the conventional temperature sensor, there is a temperature difference between the measurement point p and the connection terminal board C due to a low thermal electromotive force of about several ten microamperes per centigrade generated by the thermocouple and a distance between the measurement point p and the connection terminal board C. Furthermore, the thermocouple itself serves as a noise source. For these reasons, such a temperature sensor using the thermocouple is unsuitable as a device for sensing the object temperature to a high accuracy.

In order to provide a high accuracy, the temperature sensor requires an addition of expensive elements. In this case, the construction of the temperature sensor becomes more complex.

In cases of sensors for measuring humidity, vibration and pressure, such an addition of expensive elements is also required to obtain a high accuracy. As a result, such sensors inevitably entail a high cost and a complex construction. Furthermore, different control circuits and measuring circuits may be required for different objects to be measured, respectively.

SUMMARY OF THE INVENTION

Therefore, an object of the invention is to provide a multi-function sensor using a semiconductor laser capable of sensing a value of a measurement object, e.g. a parameter, such as temperature, humidity, pressure or vibration on the basis of a variation in the distance between a measurement object medium adapted to respond to a variation in the measurement object and a focus of laser beams projected onto the measurement object medium to thereby sense the value of the measurement object to a high accuracy irrespective of a variation in the quantity of laser beams depending on a variation in surrounding conditions.

In accordance with the present invention, this object can be accomplished by providing a multi-function sensor comprising: a laser for emitting laser beams; a beam splitter for transmitting a part of the laser beams and reflecting the remaining part of the laser beams; a measurement object medium for responding to a variation in measurement object, i.e. parameter, to be measured; a first lens for focusing the laser beams reflected by the beam splitter as a reference light; a second lens for focusing the laser beams transmitted through the beam splitter on the measurement object medium; a cylindrical lens for focusing the laser beams sequentially reflected by the measurement object medium and the beam splitter as a reflected light; a reference light measuring photo detector for measuring a quantity of the reference light; a reflected light measuring photo detector for measuring a quantity of the reflected light; a focus length detecting circuit for converting an output signal from the reflected light measuring photo detector into a distance detection signal; a normalizing circuit for calculating a ratio of an output signal of the focus length detecting circuit to an output signal of the reference light measuring photo detector and thereby measuring a relative quantity of the reflected light; and a control circuit for receiving an output signal from the normalizing circuit to thereby generate a control signal meeting a desired function.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
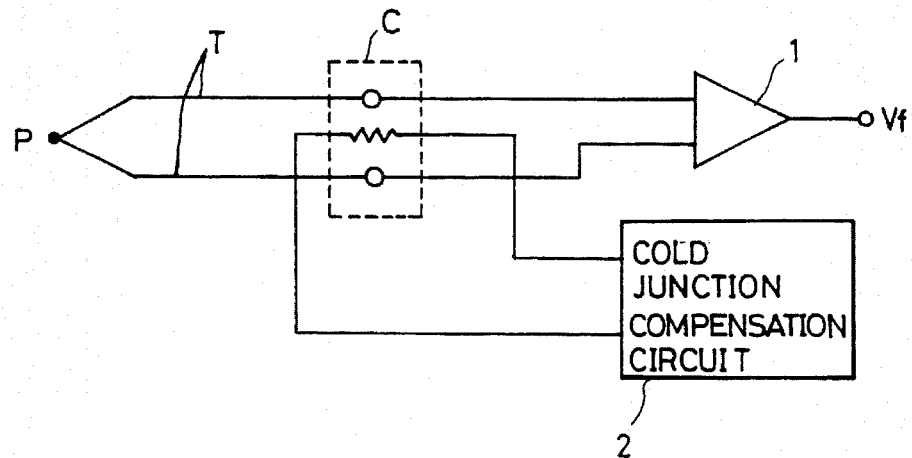
FIG. 1 is a circuit diagram of a conventional temperature sensor using a thermocouple.
Figure 2:
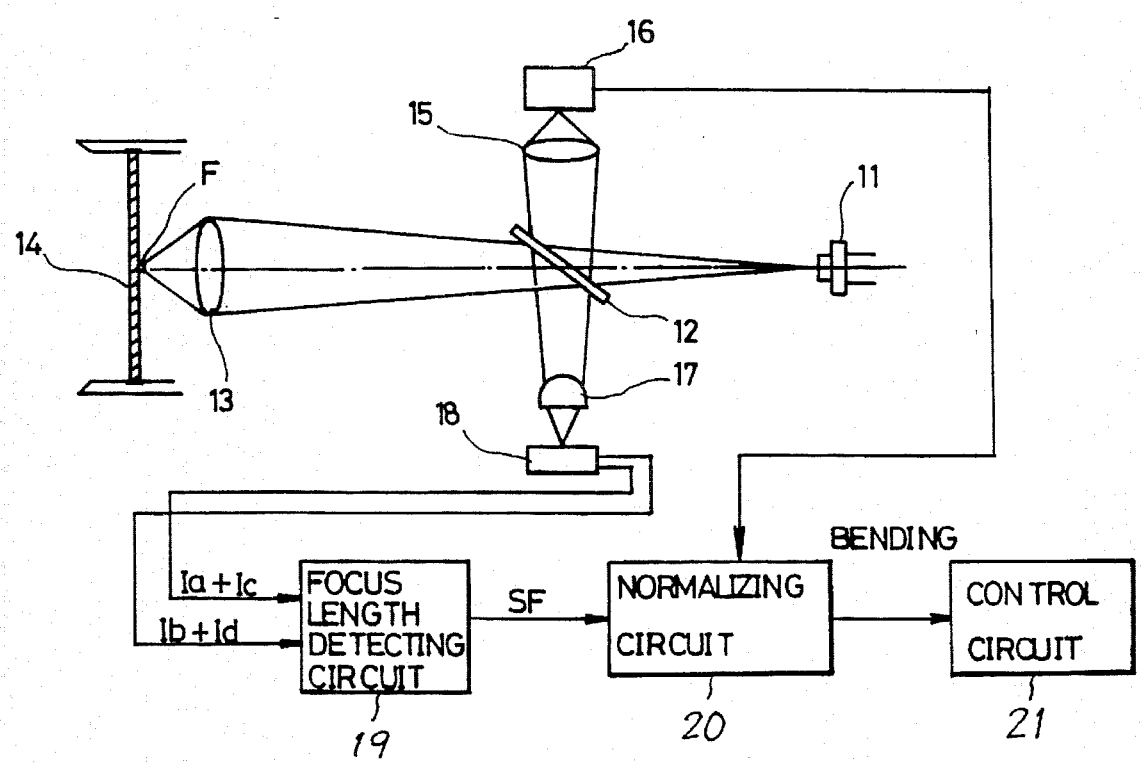
FIG. 2 is a schematic view of a multi-function sensor using a semiconductor laser in accordance with the present invention.

Referring to FIG. 2, there is illustrated a multi-function sensor using a semiconductor laser in accordance with the present invention.

As shown in FIG. 2, the multi-function sensor of the present invention includes a light source 11, such as a semiconductor laser, for emitting laser beams upon receiving an electric power and a beam splitter 12 for transmitting a part of the laser beams emerging from the semiconductor laser 11 to a lens 13 and reflecting the remaining part of the laser beams toward a lens 15. The lens 13 focuses the laser beams received from the beam splitter 12 on a measurement object medium 14 at a focus F. The measurement object medium 14 is supported by a supporting member. The measurement object medium 14 has a surface deformable into a convex shape or a concave shape depending on a variation in value of the measurement object to vary the distance thereof from the focus F. The lens 15 focuses the laser beams reflected by the beam splitter 12, namely, a reference light. The multi-function sensor further includes a reference light measuring photo detector 16 for detecting the quantity of the reference light focused thereon by the lens 15, a cylindrical lens 17 for focusing laser beams reflected by the measurement object medium 14 and then reflected by the beam splitter 12, a reflected light measuring photo detector 18 for measuring the quantity of a reflected light, namely, the laser beams focused by the cylindrical lens 17, a focus length detecting circuit 19 for converting an output signal from the reflected light measuring photo detector 18 into a distance detection signal SF, a normalizing circuit 20 for calculating the ratio of the quantity of the reflected light from the focus length detecting circuit 19 to the quantity of the reference light from the reference light measuring photo detector 16 and thereby measuring the relative quantity of the reflected light, and a control circuit for receiving an output signal from the normalizing circuit 20 and thereby generating a control signal meeting a desired function.

Figure 3:
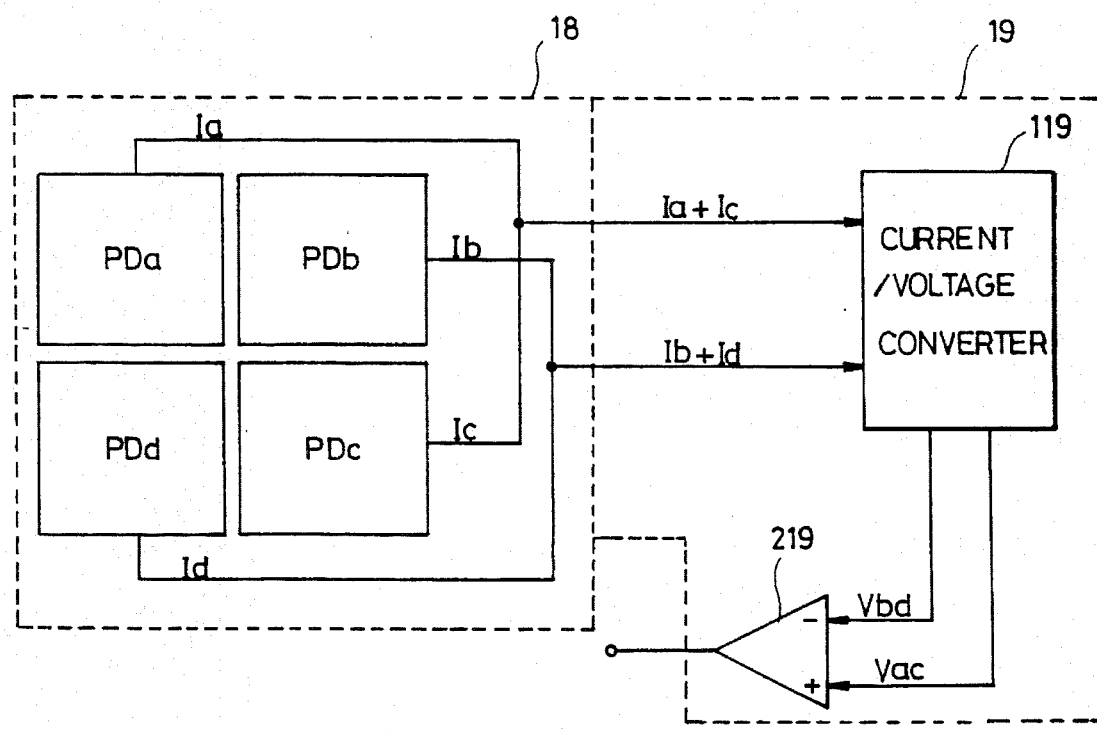
FIG. 3 is a block diagram of the multi-function sensor shown in FIG. 2, illustrating a reflected light measuring photo detector and a focus length detecting circuit.

FIG. 3 shows structures of the reflected light measuring photo detector 18 and the focus length detecting circuit 19. As shown in FIG. 3, the reflected light measuring photo detector 18 has four photo diodes PDa, PDb, PDc and PDd of the same size arranged in a square area to have a uniform fine gap between adjacent ones. The focus length detecting circuit 19 has a current/voltage converter 119 for receiving the sum Ia+Ic of current signals Ia and Ic respectively generated from the photo diodes PDa and PDc and the sum Ib+Id of current signals Ib and Id respectively generated from the photo diodes PDb and PDd and converting the received sum signals into voltage signals Vac and Vbd, respectively, and a comparator 219 for receiving the voltage signals Vac and Vbd from the current/voltage converter 119 and sending the distance detection signal SF corresponding to the difference between the voltages Vac and Vbd to the normalizing circuit 20.

Figure 4A:
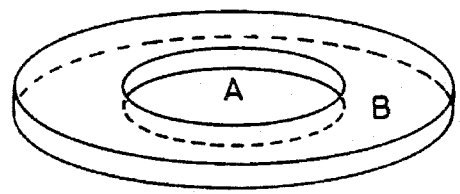
FIGS. 4A and 4B are a perspective view and a sectional view respectively illustrating a bimetal used as a measurement object medium constituting a part of the multi-function sensor shown in FIG. 2.
Figure 4B:
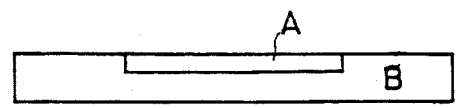

On the other hand, the measurement object medium 14 comprises a single measurement object medium capable of responding to one measurement object or a plurality of measurement object mediums respectively capable of responding to different measurement objects. This will be described in more detail.

Where the sensor of the present invention is used as a temperature sensor, the measurement object medium 14 includes a bimetal having two materials A and B exhibiting different thermal expansion coefficients depending on a variation in the measurement object, namely, the temperature, as shown in FIGS. 4A and 4B. The material A fills a central recess of the measurement object medium 14 whereas the remaining portion of the measurement object medium 14 is made of the material B.

Operation of the multi-function sensor having the above-mentioned construction in accordance with the present invention will now be described in conjunction with FIGS. 5A to 5C and FIG. 6.

Upon externally receiving a drive voltage, the semiconductor laser 11 emits laser beams and projects them onto the beam splitter 12. The beam splitter 12 transmits a part of the laser beams fed thereto. The remaining part of the laser beams is reflected by the beam splitter 12 and then fed as a reference light to the lens 15. The reference light is used to normalize a light reflected by a reflection surface of the measurement object medium 14.

The laser beams transmitted through the beam splitter 12 are focused on the measurement object medium 14 by the lens 13 and then reflected by a reflection surface of the measurement object medium 14 again. The reflected laser beams are fed to the lens 13 again. The laser beams emerging from the lens 13 are reflected by the beam splitter 12 and then fed as a reflected light to the cylindrical lens 17.

The reflected light is focused on the reflected light measuring photo detector 18 by the cylindrical lens 17 such that it is projected onto surfaces of the photo diodes PDa, PDb, PDc and PDd of the photo detector 18.

On the other hand, the measurement object medium 14 comprised of the bimetal is deformed at its central portion due to a variation in ambient temperature such that the central portion has a concave shape or a convex shape. As a result, the focus F of laser beams which is positioned on the reflection surface of the measurement object medium 14 at a room temperature is not positioned on the reflection surface at other temperatures.

Figure 5A:
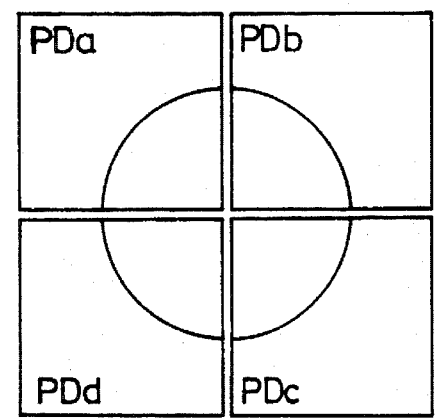
FIGS. 5A to 5C are schematic views respectively illustrating various quantities of reflected light distributed on photo diodes of the reflected light measuring photo detector.
Figure 5B:
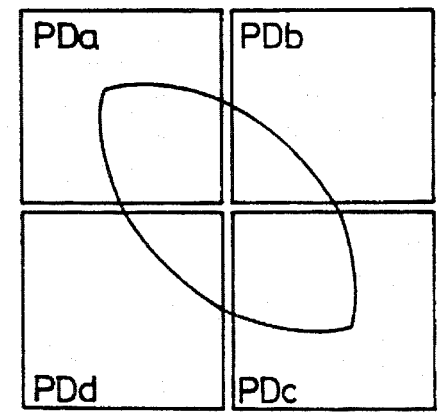
Figure 5C:
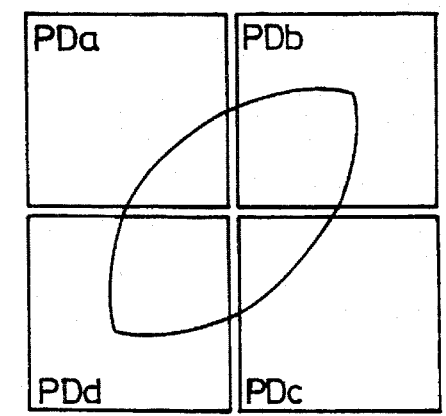

This results in a variation in the distance between the focus F and the reflection surface of the measurement object medium 14. In other words, the travel path of the laser beams is lengthened or shortened. Due to such a variation in the travel path length of reflected light, the quantity of laser beams focused on each of the photo diodes PDa, PDb, PDc and PDd of the photo detector 18 varies. This will be described in more detail.

Where the focus F of laser beams is positioned on the reflection surface of the measurement object medium 14, laser beams respectively focused on the photo diodes PDa, PDb, PDc and PDd are uniformly distributed, as shown in FIG. 5A. Where the focus F of laser beams is positioned before or behind the reflection surface of the measurement object medium 14, however, laser beams respectively focused on the photo diodes PDa, PDb, PDc and PDd are non-uniformly distributed such that a larger quantity of laser beams is distributed on particular ones of the photo diodes, as shown in FIGS. 5B and 5C. Such a phenomenon may be used to determine whether the reflection of the measurement object medium 14 has been bent inwardly or outwardly.

Accordingly, the bending direction of the measurement object medium 14 can be determined by deriving a light quantity difference from quantities of light OPDa, OPDb, OPDc and OPDd respectively distributed on the photo diodes PDa, PDb, PDc and PDd, as expressed in the following equation:

$$SF=(OPDa+OPDc)-(OPDb+OPDd)$$

Where the focus F of laser beams is positioned on the reflection surface of the measurement object medium 14, the quantities of laser beams respectively distributed on the photo diodes PDa, PDb, PDc and PDd are the same. In this case, the value of the distance detection signal SF is zero.

Where the focus F of laser beams is positioned before the reflection surface of the measurement object medium 14, the photo diodes PDa and PDc receive a larger quantity of light, as compared to the photo diodes PDb and PDd. In this case, the distance detection signal SF has a positive value because the photo diodes FDa and PDc generate a larger amount of current, as compared to the photo diodes PDb and PDd.

On the other hand, where the focus F of laser beams is positioned behind the reflection surface of the measurement object medium 14, the photo diodes PDa and PDc receive a smaller quantity of light, as compared to the photo diodes PDb and PDd. In this case, the distance detection signal SF has a negative value because the photo diodes PDa and PDc generate a smaller amount of current, as compared to the photo diodes PDb and PDd.

Figure 6:
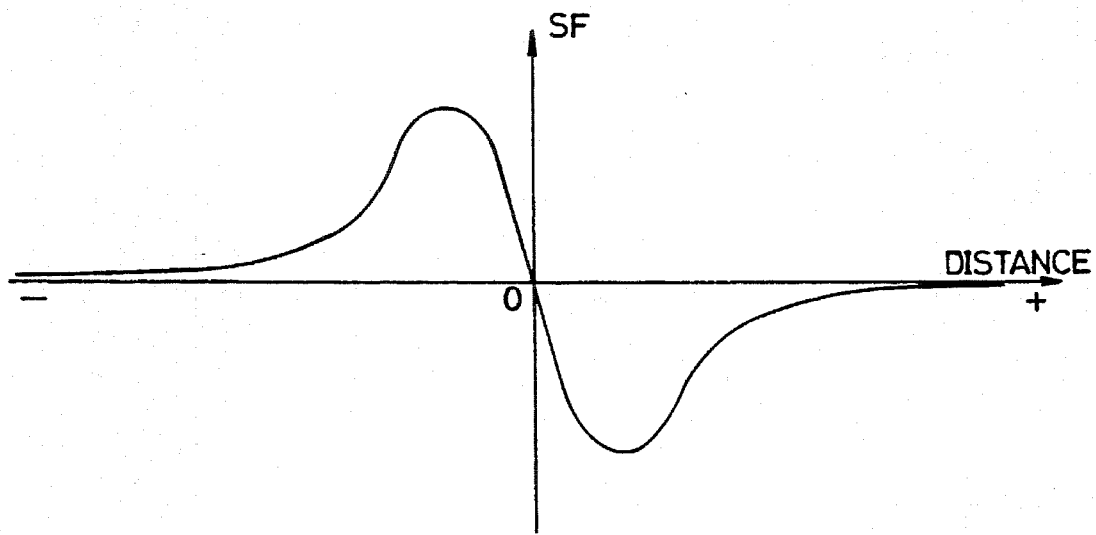
FIG. 6 is a graph illustrating a variation in level of a distance detection signal depending on a variation in distance between a reflection surface of the measurement object medium and a focus of laser beams in the multi-function sensor shown in FIG. 2.

Such a relationship will be described in more detail in conjunction with FIG. 3. The photo diodes PDa, PDb, PDc and PDd generate currents Ia, Ib, Ic and Id corresponding to quantities of laser beams focused thereon, respectively. The sum Ia+Ic of the currents Ia and Ic and the sum Ib+Id of the currents Ib and Id are converted into voltages Vac and Vbd by the current/voltage converter 119 of focus length detecting circuit 19, respectively. Thereafter, the comparator 219 outputs a distance detection signal SF indicative of the difference between the voltages Vac and Vbd. The distance detection signal SF varies in level depending on the distance between the reflection surface of the measurement object medium 14 and the focus F, as shown in FIG. 6.

Under a condition that the ambient temperature increases or that the semiconductor layer 11 operates for a long time, the temperature of the semiconductor laser 11 itself increases, thereby causing the quantity of laser beams emitted from the semiconductor layer 11 to vary. As a result, the quantity of laser beams focused on each photo diode of the photo detector 18 is varied.

Where the quantity of laser beams focused on each photo diode of the photo detector 18 is varied due to such an outside factor, an error may occur in the measurement of the bending degree of measurement object medium 14.

In order to eliminate such an error caused by the outside factor, a part of the laser beams emitted from the semiconductor laser 11 is used as a reference light.

That is, a part of the laser beams reflected by the beam splitter 12 is projected onto the reference light measuring photo detector 16 which, in turn, measures the quantity of laser beams applied thereto so that the measured quantity of laser beams is used as a reference light quantity.

The normalizing circuit 20 then measures a relative quantity of light based on both the quantity of reference light and the quantity of light reflected by the reflection surface of the measurement object medium 14.

In other words, the normalizing circuit 20 derives the bending degree, namely, bending distance of the measurement object medium 14 using the distance detection signal SF and a reference signal REF indicative of the quantity of reference light, as expressed by the following equation, and thereby generates a bending distance signal BENDING indicative of the bending distance of the measurement object medium 14.

$$BENDING = \frac{SF}{REF}$$

Even though a variation in the quantity of laser beams emitted from the semiconductor laser 11 occurs due to a variation in surrounding circumstance, there is no affect on calculation of the bending distance because both the distance detection signal SF and the reference signal REF are varied.

The control circuit 21 receives the bending distance signal BENDING from the normalizing circuit 20 and thereby generates an appropriate control signal to control the overall system.

Accordingly, it is possible to accurately measure a small variation in bending distance of the refection surface of measurement object medium 14.

In the illustrated embodiment, the sensor of the present invention has been described as being adapted to detect a variation in the bending distance of the bimetal constituting the measurement object medium depending on a variation in ambient temperature and thereby detect a temperature.

The sensor may be used to measure other measurement objects such as pressure, vibration, humidity and etc., by mounting additional measurement object mediums to the supporting member and measuring a variation in bending distance of the reflection surface of each measurement object medium.

For example, where an ambient pressure is to be measured, a plate member having an elasticity and a durability capable of bearing the pressure to be measured is mounted as a measurement object medium to the supporting member. In this case, the measurement object medium is bent, in response to the pressure applied thereto, by the applied pressure and the elasticity thereof. The bending degree of the measurement object medium is determined depending on the degree of the pressure applied. A variation in the distance between the reflection surface of the measurement object medium and the focus of laser beams depending on the bending degree of the measurement object medium is detected in a manner similar to that in the above-mentioned case employing the bimetal for the temperature measurement. Thus, the variation in ambient pressure can be measured.

Where a vibration is to be measured, a thin film having an elasticity is mounted as a measurement object medium to the supporting member. When the measurement object medium senses the pressure generated in the vicinity thereof, it is bent by the sensed vibration. The bending degree of the measurement object medium is determined depending on the degree of the vibration applied. A variation in the distance between the reflection surface of the measurement object medium and the focus of laser beams depending on the bending degree of the measurement object medium is detected in a manner similar to that in the above-mentioned case employing the bimetal for the temperature measurement. Thus, the variation in vibration can be measured.

On the other hand, where an ambient humidity is to be measured, a dehumidifying film capable of absorbing the ambient humidity is mounted as a measurement object medium to the supporting member. When the measurement object medium senses the humidity, it is bent by the humidity absorbed therein. The bending degree of the measurement object medium is determined depending on the degree of the humidity absorbed. In this case, it is preferred that the reflection surface of the measurement object medium is arranged in parallel to the horizon against the gravity. A variation in the distance between the reflection surface of the measurement object medium and the focus of laser beams depending on the bending degree of the measurement object medium is detected in a manner similar to that in the above-mentioned case employing the bimetal for the temperature measurement. Thus, the variation in ambient humidity can be measured.

As apparent from the above description, the present invention provides a multi-function sensor including a semiconductor laser as a light source and a measurement object medium, capable of measuring, in a high accuracy, a desired measurement object such as temperature, pressure, vibration, humidity and etc. irrespective of variations in surrounding circumstances by detecting a variation in the measurement object on the basis of a variation in the distance between the reflection surface of the measurement object medium and the focus of laser beams. Where the sensor of the present invention includes various object mediums respectively for different measurement objects, it can provide an effect of measuring various measurement objects.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-function sensor comprising:

a laser for emitting laser beams;

a beam splitter for transmitting a part of the laser beams and reflecting the remaining part of the laser beams;

a measurement object medium for responding to a variation in measurement object to be measured;

a first lens for focusing the laser beams reflected by the beam splitter as a reference light;

a second lens for focusing the laser beams transmitted through the beam splitter on the measurement object medium;

a cylindrical lens for focusing the laser beams sequentially reflected by the measurement object medium and the beam splitter as a reflected light;

a reference light measuring photo detector for measuring a quantity of the reference light;

a reflected light measuring photo detector for measuring a quantity of the reflected light;

a focus length detecting circuit for converting an output signal from the reflected light measuring photo detector into a distance detection signal;

a normalizing circuit for calculating a ratio of an output signal of the focus length detecting circuit to an output signal of the reference light measuring photo detector and thereby measuring a relative quantity of the reflected light; and a control circuit for receiving an output signal from the normalizing circuit and thereby generating a control signal meeting a desired function.

2. A multi-function sensor in accordance with claim 1, wherein the focus length detecting circuit comprises:

a current/voltage converter for converting a sum of current signals generated from photo diodes of one of two photo diode pairs constituting the reflected light measuring photo detector and a sum of current signals generated from photo diodes of the other pair into voltage signals, respectively; and a comparator for outputting a difference between the voltage signals of the current/voltage converter as a distance detection signal.

3. A multi-function sensor in accordance with claim 1, wherein the measurement object medium comprises a bimetal for varying a distance from a focus of the laser beams made by the second lens, depending on a variation in temperature.

4. A multi-function sensor in accordance with claim 1, wherein the measurement object medium is adapted to respond to at least one of measurement objects including a pressure, a vibration or a humidity and convert a variation in the measurement object into a variation in distance.

* * * * *